(12) United States Patent  
Usui

(10) Patent No.: US 10,953,585 B2  
(45) Date of Patent: Mar. 23, 2021

(54) MOLDING MATERIAL OF SAPONIFIED ETHYLENE-VINYL ESTER-BASED COPOLYMER

(71) Applicant: MITSUBISHI CHEMICAL CORPORATION, Tokyo (JP)

(72) Inventor: Shintaro Usui, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 56 days.

(21) Appl. No.: 16/654,742

(22) Filed: Oct. 16, 2019

(65) Prior Publication Data

US 2020/0047386 A1    Feb. 13, 2020

Related U.S. Application Data

(63) Continuation of application No. 15/103,084, filed as application No. PCT/JP2014/083784 on Dec. 19, 2014, now abandoned.

(30) Foreign Application Priority Data

Dec. 27, 2013    (JP) .................................. 2013-270993

(51) Int. Cl.  
    *B29C 48/04*    (2019.01)  
    *B29B 9/12*    (2006.01)  
    (Continued)

(52) U.S. Cl.  
    CPC ................ *B29C 48/04* (2019.02); *B29B 9/12* (2013.01); *B29B 7/38* (2013.01); *B29B 7/728* (2013.01);  
(Continued)

(58) Field of Classification Search  
    CPC ..... B29C 48/04; B29C 47/0011; B29B 9/065; B29B 9/12; B29B 7/38; B29B 7/728; B29B 9/06; B29B 9/16  
    See application file for complete search history.

(56) References Cited

U.S. PATENT DOCUMENTS 3,925,336 A    12/1975  Sawada  
6,503,588 B1    1/2003  Hayashi  
(Continued)

FOREIGN PATENT DOCUMENTS

EP    1059163    12/2000  
EP    1120223    8/2001  
(Continued)

OTHER PUBLICATIONS

ISR issued with respect to Application No. PCT/JP2014/083784, dated Mar. 3, 2015, English translation.

(Continued)

*Primary Examiner* — Abbas Rashid  
*Assistant Examiner* — S. Behrooz Ghorishi  
(74) *Attorney, Agent, or Firm* — Greenblum & Bernstein, P.L.C.

(57) ABSTRACT

Provided is a melt-molding material which is produced using an EVOH resin and has improved feeding property. A pellet mixture comprising a first EVOH resin pellets (pellet 1) each having approximately circular or elliptical cross-section and having an ethylene unit content of 20 to 34 mol %, and a second EVOH resin pellets (pellet 2) each having ethylene unit content of 35 to 60 mol %, wherein the difference of ethylene unit content between the pellet 1 and the pellet 2 is from 10 to 30 mol %.

6 Claims, 3 Drawing Sheets

(51) Int. Cl.
  *B29B 7/72* (2006.01)
  *B29B 9/06* (2006.01)
  *B29B 7/38* (2006.01)
  *B29K 23/00* (2006.01)
  *B29K 31/00* (2006.01)
  *B29L 31/00* (2006.01)
(52) U.S. Cl.
  CPC ............... *B29B 9/06* (2013.01); *B29B 9/065* (2013.01); *B29K 2023/086* (2013.01); *B29K 2031/00* (2013.01); *B29L 2031/772* (2013.01)

(56) References Cited

U.S. PATENT DOCUMENTS

| | | | |
|---|---|---|---|
| 9,999,990 B2 | 6/2018 | Usui | |
| 2004/0091653 A1* | 5/2004 | Tai | B65D 1/0215 |
| | | | 428/35.7 |
| 2009/0321300 A1* | 12/2009 | Komiya | B29B 9/12 |
| | | | 206/584 |
| 2014/0145374 A1 | 5/2014 | Altonen et al. | |

FOREIGN PATENT DOCUMENTS

| | | |
|---|---|---|
| EP | 3081590 | 10/2016 |
| JP | H3-61507 | 3/1991 |
| JP | 2001-96530 | 4/2001 |

OTHER PUBLICATIONS

IPRP issued with respect to Application No. PCT/JP2014/083784, dated Jun. 28, 2016, English translation.
Extended European Search Report dated Jul. 17, 2017, for family member EP14874910.

\* cited by examiner

[Fig 1]
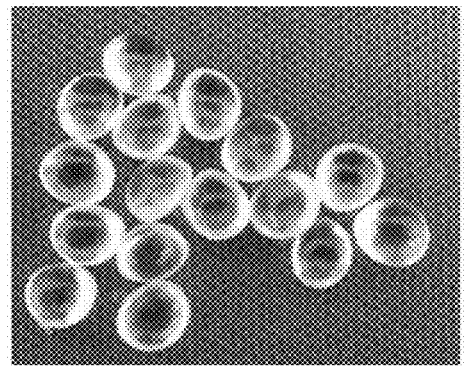
[Fig.2]
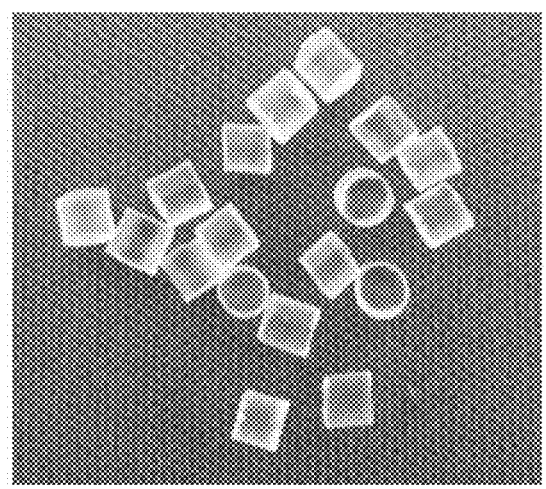
[Fig.3]
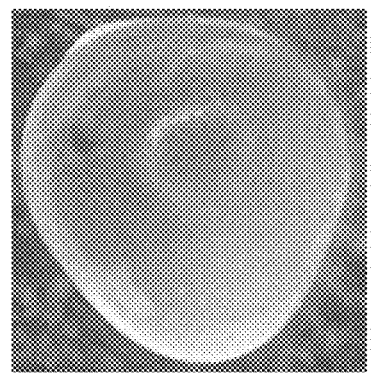

[Fig.4]
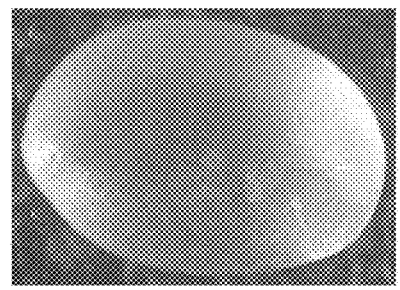
[Fig.5]
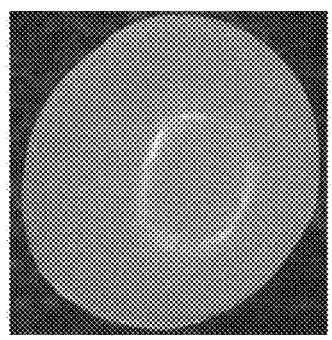
[Fig.6]
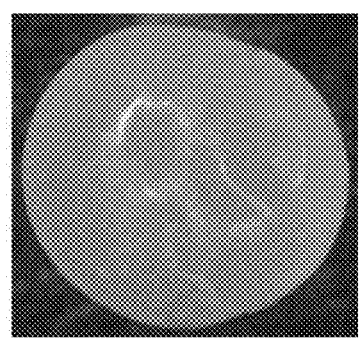
[Fig.7]
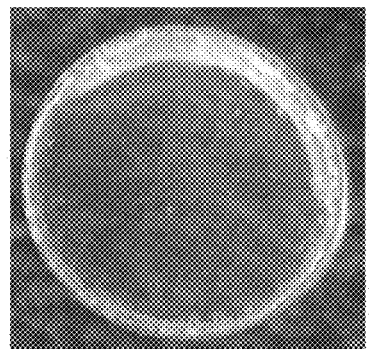

[Fig.8]
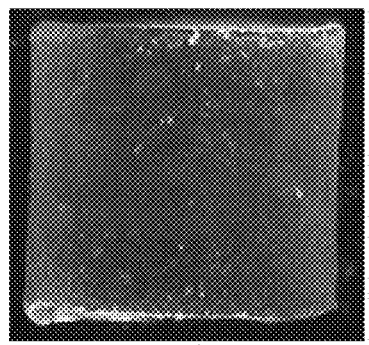

MOLDING MATERIAL OF SAPONIFIED ETHYLENE-VINYL ESTER-BASED COPOLYMER

The present application is a continuation application of U.S. patent application Ser. No. 15/103,084, filed on Jun. 9, 2016, which is a National Phase application of International Application No. PCT/JP2014/083784, filed on Dec. 19, 2014, which claims the benefit of Japanese Patent Application No. 2013-270993, filed on Dec. 27, 2013. The entire disclosure of each of the above-identified applications, including the specification, drawings, and claims, is incorporated herein by reference in its entirety.

TECHNICAL FIELD

The present invention relates to a molding material consisting of saponified ethylene-vinyl ester-based copolymer (hereinafter, referred to as "EVOH resin") pellets, in particular, relates to a molding material consisting of EVOH resin pellets excellent in feed property in melt extrusion molding.

BACKGROUND ART

EVOH resin has a high crystallinity due to firmly hydrogen bonding between hydroxyl groups in its polymer chain, therefore exhibiting strong intermolecular force. Not only crystal part but also amorphous part in EVOH resin can exhibit strong intermolecular force. This provides EVOH resin film with excellent gas-barrier property.

EVOH resin is utilized for packaging film or sheet, or container such as bottle for food, pharmaceutical, industrial medicine, agricultural chemicals, and so on, because of the excellent gas-barrier property. EVOH resin for molding these articles are commonly distributed in the form of columnar or granular pellet having a length of about 1 to about 10 mm.

In general, EVOH resin pellets are produced by strand pelletizing process, which is disclosed in JP H3-61507A (Patent document 1) and so on. The strand pelletizing process comprises extruding a solution in which EVOH resin (or its composition) is dissolved in a solvent into a coagulating bath through the metal plate outlet having an opening of 1 to 5 mm in diameter, or extruding a molten resin through die, and making the molten resin solidify by cooling to obtain a rod-shaped strand, followed by cutting the strand at appropriate intervals of distance. Thus EVOH resin pellets are obtained.

The strand is soft and flexible even in a solid state after cooling, and therefore the strand extruded through the metal plate outlet or die runs like snaking. The strand is sometimes cut diagonally, and thus produced pellets do not have even size, which is a problem. The Patent document 1 suggests, for producing pellets having even size, establishing appropriate conditions of strand run, position of cutter, and so on.

As described in JP2001-96530A (Patent document 2), the strand pelletizing process has difficulty in cutting large volume of resin precisely for a short time. Such difficulty is particularly noted when producing pellets from EVOH resin having low content of ethylene unit and low saponification degree.

As a solution of the problem associated with strand pelletizing process, the Patent document 2 suggests a hot-cut pelletizing process in which EVOH resin melt containing water is cut immediately after discharging from the extruder. The hot-cut pelletizing process is classified into air hot-cut pelletizing process and underwater pelletizing process. The air hot-cut pelletizing process produces pellets by cutting EVOH resin melt containing water with rotating cutter immediately after discharging from outlet of a twin-screw extruder. The underwater pelletizing process produces pellets by extruding EVOH resin to a chamber equipped with cutter and filled in cooling water, followed by cutting in the water immediately.

In Example of the patent document 2, EVOH resins having ethylene unit content of 32 mol %, 20 mol %, and 55 mol % were used to produce pellets of Examples 1-3 respectively and Comparative Examples 1-3 respectively. The pellets of examples 1-3 produced by hot-cut pelletizing process have disc- or flattened disc-shape, and are almost uniform in size. Whereas pelletizing process in comparative examples 1-3 often takes a break because of strand broken, wherein the pelletizing process is performed by extruding molten resin through die having plurality of holes arranged in horizontal direction into cooling water to solidify, followed by cutting the solidified resin, i.e. strand, into pellets,

PRIOR ART

Patent Document

[Patent document 1] JP H3-61507A
[Patent document 2] JP2001-96530A

SUMMARY OF THE INVENTION

Technical Problem to be Solved by the Invention

The hot-cut pelletizing process in the Patent document 2 can treat a large volume of resin and cut resin melt at intervals of precisely given length to produce pellets highly uniform in their size effectively.

On the other hand, pellets produced by strand pelletizing process (hereinafter, sometimes called "strand cut pellets") has not only problem associated with the production of pellets described in the patent document 2 but also problems associated with melt-molding with use of the pellets, i.e. worse feed property. In the case of feeding strand cut pellets to a melt extrusion machine, there is a feed property problem that screw vibrates or noise raises due to variable torque while molten resin flows at melt softening section. A noise causes from overload for screw, which might make the screw worn. The worn powder generated might contaminate flowing molten resin, in worse case.

In the case of melt molding the pellets produced by hot-cut pelletizing process suggested in the Patent document 2, noise in melt-molding is reduced comparing to noise in melt molding of the strand cut pellets. However, noise emission should be more reduced.

Under these situations, the present invention has been completed. The object of the invention is to provide a molding material exhibiting excellent feed property for melt molding of EVOH resin.

Means for Solving the Problems

The present inventor has studied about feed property of pellets and supposed that the noise raises for the following reasons. Strand cut pellets each has a sharp corner edge at the cut face because the pellets are produced by cutting solid strand at intervals. Even if the columnar strand having a circular cross-section are cut into pellets, the obtained pellets each has a sharp edge at the cut face. If such pellets each having a sharp edge are fed to an extruder equipped with melt softening section, the screw at resin flow passage section would circumvolute air, alternatively the sharp edge would come into contact with the screw, resulting in noise emission.

The inventors supposed the reason of production of round pellets each having no edges by hot-cut pelletizing process. This is because a piece of resin melt obtained by cutting resin in molten state droops at cut face before solidifying, and results in rounding due to its surface in tension. A round pellet with no edges could exhibit excellent flow property at screw passage in melt softening section, as a result, noise could be reduced.

However, even when such round pellets are used as a molding material, noise still raises. The inventors has further studied noise emission and achieved the invention.

A molding material of saponified ethylene-vinyl ester-based copolymer of the invention comprises saponified ethylene-vinyl ester-based copolymer (EVOH resin) pellets. Each of the EVOH resin pellets has approximately circular or elliptical cross-section. Also, the EVOH resin pellets are a pellet mixture comprising a first EVOH resin pellet (pellet 1) having an ethylene unit content of 20 to 34 mol %, and an second EVOH resin pellet (pellet 2) having an ethylene unit content of 35 to 60 mol %. The difference in ethylene unit content between the first and second EVOH resin pellets is from 10 to 30 mol %.

The pellets are obtained by cutting molten EVOH resin into pellets. The cutting is performed preferably by extruding molten EVOH resin into water and cutting it in water during its molten state.

A ratio in weight of contents of the first EVOH resin pellet (pellet 1) to the second EVOH resin pellet (pellet 2) in said pellets, i.e. pellet 1/pellet 2, is preferably in the range of 95/5 to 50/50. The pellet mixture is preferably a dry blend of the first EVOH resin pellet and the second EVOH resin pellet.

Preferably, the first EVOH resin pellet has a cross-section of ellipse or circle having maximum major axis of 1 to 10 mm and maximum minor diameter of 1 to 10 mm, and the second EVOH resin pellet has a cross-section of ellipse or circle having maximum major axis of 1 to 10 mm and maximum minor diameter of 1 to 10 mm. More preferably, the first EVOH resin pellet has a ratio (m/n) of maximum major axis (m) to maximum minor diameter (n) is from 1.0 to 2.0, and the second EVOH resin pellet has a ratio (m'/n') of maximum major axis (m') to maximum minor diameter (n') is from 1.0 to 2.0.

In another aspect of the invention, a method of improving feed property when an EVOH resin pellets are fed with screw for melt extrusion molding thereof is provided. The method comprises using a pellet mixture of a first EVOH resin pellet (pellet 1) and a second EVOH resin pellet (pellet 2), wherein the pellet 1 has an ethylene unit content of 20 to 34 mol % and is approximate circle or ellipse in cross-section, and the pellet 2 has an ethylene unit content of 35 to 60 mol % and is approximate circle or ellipse in cross-section, and they differ in their ethylene unit content by 10 to 30 mol %.

The content of ethylene unit in this specification is a measurement value, which is determined according to, for example, ISO14663.

The saponification degree of vinyl ester component in this specification is a measurement value, which is determined according to, for example, JIS K6726 with the proviso that EVOH resin is dissolved in a mixture of water and methanol, and thus obtained homogeneous solution is measured.

Effect of the Invention

The melt molding material using EVOH resin of the invention is a pellet mixture, each of pellets has almost circular or elliptical cross-section with no edge, and the pellet mixture comprises 2 types of pellets differing in their ethylene unit content. The pellet mixture exhibits excellent feed property in melt-molding.

BRIEF DESCRIPTION OF THE DRAWINGS

FIG. 1 is a photograph of appearance of EVOH resin pellets produced by hot-cut pelletizing process, FIG. 2 is a photograph of appearance of columnar EVOH resin pellets produced by strand pelletizing process, FIG. 3 is a photograph of cross-sectional view of oval pellet UP1 obtained in example, cut in direction perpendicular to major axis of the pellet, FIG. 4 is a photograph of a cross-sectional view of oval pellet UP1 obtained in example, cut in direction along major axis of the pellet, FIG. 5 is a photograph of cross-sectional view of almost spherical pellet UP2 obtained in example, FIG. 6 is a photograph of cross-sectional view of almost spherical pellet UP2 obtained in example, cut in direction perpendicular to the cutting direction employed in FIG. 5, FIG. 7 is a photograph of cross-section of the columnar pellet SP1 obtained in example, cut in direction parallel to bottom surface of the pellet, and FIG. 8 is a photograph of cross-section of the columnar pellet SP1 obtained in example, cut in direction along the height of the pellet.

MODES FOR CARRYING OUT THE INVENTION

A molding material of the invention consists of saponified ethylene-vinyl ester-based copolymer (EVOH resin) pellets.

Each of the pellets has a cross-section of approximate circle or ellipse.

The pellets are a mixture of pellets comprising a first EVOH resin pellet (pellet 1) having ethylene unit content of 20 to 34 mol %, and a second EVOH resin pellet (pellet 2) having ethylene unit content of 35 to 60 mol %, and the difference in ethylene unit content between the first and second EVOH resin pellets ranges from 10 to 30 mol %.

<Saponified Ethylene-Vinyl Ester-Based Copolymer (EVOH Resin.) Pellet>

(1) EVOH Resin

A saponified ethylene-vinyl ester copolymer (EVOH resin) used for the molding material is a saponified ethylene-vinyl ester copolymer obtained by copolymerizing ethylene and vinyl ester-based monomer and saponifying the obtained ethylene-vinyl ester copolymer. The EVOH resin is insoluble thermoplastic resin.

In general, vinyl acetate is used for the vinyl ester-based monomer from the viewpoint of economics. Any known polymerization method, for example, solution polymerization, suspension polymerization, emulsion polymerization, or bulk polymerization may be employed for the polymerization, and a common polymerization method is solution polymerization using methanol as a solvent. Continuous process and batch process may be employed for the polymerization.

Copolymerizing ethylene with vinyl ester monomer is usually performed by introducing pressurized ethylene into a polymerization system. Ethylene unit content may be controlled by ethylene pressure, and is commonly selected from the range of 25 to 80 kg/cm$^2$ depending on the desired ethylene unit content.

Saponification of the obtained ethylene-vinyl ester copolymer may be carried out by a known method, where the copolymer in the state of dissolving in alcohol or alcohol containing water, is saponified in the presence of alkali catalyst or acid catalyst.

The EVOH resin thus produced contains ethylene unit and vinyl alcohol structural unit as main constituting units and further contains a bit of vinyl ester structural unit as a left unsaponified unit.

EVOH resin used for the material of EVOH resin pellets may further contain a unit derived from the following comonomer. Examples of the comonomer include α-olefins such as propylene, isobutene, α-octene, α-dodecene, and α-octadecen; hydroxyl group-containing α-olefins such as 3-buten-1-ol, 4-penten-1-ol and 3-buten-1,2-diol; hydroxyl group-containing α-olefin derivatives such as esterified or acylated product of the hydroxyl group-containing α-olefin; unsaturated carboxylic acid, salt thereof, or partially alkyl ester, completely alkyl ester, nitrile, amide, anhydride, unsaturated sulfonic acid or salt thereof, vinylsilane compound, vinyl chloride, styrene, or a like comonomer.

Furthermore, a post-modified EVOH resin such as urethanated, acetalized, cyanoethylated, or oxyalkylenated EVOH resin may also be used.

In such modified EVOH resin, an EVOH resin having a primary hydroxyl group at a side chain introduced by copolymerization is preferred from the viewpoint of improved formability in post-molding process such as stretching process, vacuum- or air-pressure forming. Particularly preferable modified-EVOH resin is EVOH resin in which 1,2-diol structural unit is introduced at the side chain thereof.

Ethylene unit content of EVOH resin pellets used as a molding material is within the range of 20 to 60 mol %. The ethylene unit content is unduly low, the resulting molded product, especially stretched film, would exhibit a lowered gas-barrier property under high humidity. If the ethylene unit content is unduly high, the stretched film would exhibit lowered gas-barrier property.

The saponification degree of vinyl ester unit of EVOH resin used for the molding materials in the range of usually 90 mol % or more, preferably 93 to 99.99 mol %, particularly preferably 98 to 99.99 mol %. If the saponification degree is unduly low, the resulting stretched film would be lowered in gas-barrier property and humidity resistance.

The melt flow rate (MFR) at 210° C. and 2160 g load of EVOH resin of the pellets used for the molding material is in the range of usually 1-100 g/10 minutes, preferably 2-50 g/10 minutes, particularly preferably 3-30 g/10 minutes. If the EVOH resin has unduly high MFR, mechanical strength of the molded product therefrom tends to be lowered. If the EVOH resin has unduly low MFR, extrusion processability in molding tends to be lowered.

The conditions of copolymerization are not particularly limited, but usually employ the following conditions.

Examples of the solvent used in the copolymerization include lower alcohols such as methanol, ethanol, propanol, and butanol, and ketones such as acetone, and among them, methanol is preferably used in industry.

The amount of the solvent to be used is appropriately determined depending on the desired polymerization degree of the copolymer, with taking account of chain transfer coefficient of the solvent used. In the case of using methanol as the solvent, the ratio of solvent (S) to monomer (M) in weight, S/M, is selected from the range of 0.01 to 10, preferably 0.05 to 7.

Examples of catalyst used in the copolymerization include a known radical polymerization catalyst such as azobisisobutyronitrile, acetyl peroxide, benzoyl peroxide, and lauryl peroxide, as well as low temperature active radical polymerization catalyst including peroxyesters such as t-butyl peroxyneodecanoate, t-butyl peroxypivalate, α,α' bis (neodecanoylperoxy) diisopropyl benzene, cumil peroxyneodecanoate, 1,1,3,3-tetramethyl butylperoxydecanoate, 1-cyclohexyl-1-methyl ethylperoxydecanoate, t-hexylperoxyneodecanoate, and t-hexylperoxypivalate; peroxydicarbonate such as di-n-propylperoxydicarbonate, di-iso-propylperoxydicarbonate, di-sec-butylperoxydicarbonate, bis (4-t-butylcyclohexyl)peroxy dicarbonate, di-2-ethoxy ethylperoxydicarbonate, di(2-ethylhexyl)peroxydicarbonate, dimethoxy butylperoxydicarbonate, di(3-methyl-3-methoxy butylperoxy)dicarbonate; diacylperoxide such as 3,3,5-trimethylhexanoyl peroxide, diisobutyryl peroxide, and lauroyl peroxide.

The proper amount of the polymerization catalyst to be used varies depending on the type of catalyst, and is usually selected according to polymerization rate. For example, in the case of using azobisisobutyronitrile or acetyl peroxide, the amount is preferably selected from the range of 10 to 2000 ppm, particularly 50 to 1000 ppm based on vinyl ester-based monomer.

It is preferred that a hydroxy lactone-based compound or a hydroxycarboxylic acid is used with the catalyst because their copresence can suppress pellet coloration. The hydroxyl lactone-based compound is a compound containing lactone ring and hydroxyl group, and include L-ascorbic acid, erythorbic acid, glucono-δ-lactone and so on, but not limited thereto. Preferably L-ascorbic acid and erythorbic acid are used. Examples of hydroxyl carboxylic acid include glycolic acid, lactic acid, glycerin acid, malic acid, tartaric acid, citric acid, and salicylic acid, and citric acid is preferable among them.

In the case of using hydroxy lactone-based compound or hydroxy carboxylic acid, its amount is selected from the range of 0.0001 to 0.1 part by weight, preferably 0.0005 to 0.05 part by weight, further preferably 0.001 to 0.03 part by weight, based on 100 parts of vinyl ester-based monomer, when polymerization is performed in batch process and continuous process. The amount is unduly low, the copresence effect would not be obtained sufficiently. On the contrary, the amount is unduly high, polymerization of vinyl ester-based monomer would be inhibited. When the compound is added to the polymerization system, the compound is usually dissolved in a solvent such as water, lower aliphatic alcohol (e.g. methanol, ethanol, propanol, and tert-butanol), aliphatic ester containing vinyl ester-based monomer (e.g. methyl acetate and ethyl acetate), or mixture thereof to feed to the polymerization reaction system, but not limited thereto.

Copolymerization temperature depending on solvent used or pressure in the system, but is commonly a temperature lower than the boiling point of the solvent, preferably within 40 to 80° C., particularly within 55 to 80° C. The copolymerization temperature is unduly low, the copolymerization reaction takes long time, but the shortened copolymerization time requires a large amount of catalyst. The copolymerization temperature is unduly high, polymerization control would become difficult.

The polymerization time is selected from the range of 4 to 10 hours, preferably 6 to 9 hours in the case of batch process. If the polymerization time is unduly short, polymerization temperature needs to be elevated or the amount of catalyst needs to be increased. On the contrary, unduly long polymerization time is unpreferred in productivity. In the case of continuous process, average residence time in polymerization reactor is from 2 to 8 hours, preferably 2 to 6 hours. An unduly short residence time requires a higher polymerization temperature or a larger amount of catalyst. On the contrary, an unduly long polymerization time cause a problem in productivity.

Rate of polymerization of vinyl ester-based monomer is set as high as possible within the range controllable in polymerization, preferably within 20 to 90%, from the viewpoint of productivity. Unduly low rate of polymerization causes a problem associated with productivity or increase of unpolymerized vinyl acetate monomer. On the contrary, unduly high rate of polymerization makes polymerization control difficult.

When the rate of polymerization arrives at desired one by polymerization for a predetermined time, if necessary, a polymerization inhibitor is added, and removal of unreacted ethylene gas is removed by its evaporation, followed by removing unreacted vinyl ester.

After removing ethylene by its evaporation, unreacted vinyl ester is further removed from the ethylene-vinyl ester copolymerization system by, for example, a method that the ethylene-vinyl ester copolymer solution is continuously fed at a constant rate from an upper portion of a tower equipped with Raschig rings while gaseous organic solvent such as methanol is blown from bottom of the tower, and thereby allowing a distillate of mixed gas of the gaseous organic solvent and unreacted vinyl ester to flow out of the top. A final copolymer solution substantially free from the unreacted vinyl ester can be taken out from the bottom of the tower.

The final copolymer solution absent vinyl ester is saponified upon addition of alkali catalyst. The vinyl ester unit contained in the copolymer is saponified.

The saponification is performed in the presence of alkali or acid catalyst in the state of solution of the vinyl ester copolymer dissolving in alcohol or alcohol containing water. Examples of the alcohol include methanol, ethanol, propanol, tert-butanol or a like alcohol, and among them, methanol is preferred. The content of the vinyl ester copolymer in the alcohol is appropriately selected depending on viscosity of the solution, usually from the range of 10 to 60% by weight. As the catalyst for the saponification, alkali catalyst including hydroxide or alcoholate of alkali metal such as sodium hydroxide, potassium hydroxide, sodium methylate, sodium ethylate, potassium methylate, and lithium methylate; and acid catalyst including sulfuric acid, hydrochloric acid, nitric acid, methanesulfonic acid, zeolite, and cation exchange resin may be used.

The amount of the saponification catalyst is appropriately selected depending on saponification process, desired saponification degree and so on. In the case of using alkali catalyst, the amount ranges usually from 0.001 to 0.1 equivalent, preferably from 0.005 to 0.05 equivalent, based on the total amount of monomers including vinyl ester-based monomer and so on. Any saponification method such as batch saponification, continuous saponification on belt, and continuous saponification in tower may be employed according to a desired saponification degree. Saponification in tower under continuous pressure is preferably conducted because the method can reduce the amount of alkali catalyst for the saponification and can improve the efficiency of the saponification reaction.

An appropriate saponification pressure depends on an intended ethylene unit content of EVOH resin, and selected from the range of 2 to 7 $kg/cm^2$. The saponification temperature is selected from the range of 80 to 150° C., preferably 100 to 130° C. The saponification time is selected from the range of 0.5 to 3 hours. After the saponification, the obtained EVOH resin is neutralized, if necessary.

Thus produced EVOH resin is used as a raw material of pellets. Alternatively, an EVOH resin composition containing, besides thus produced EVOH resin, a common additive, for example, heat stabilizer, antioxidant, antistatic agent, colorant, ultraviolet absorber, plasticizer, light stabilizer, surfactant, insecticide, drying agent, anti-blocking agent, fire retardant, crosslinking agent, curing agent, foaming agent, crystal forming agent, anti-fogging agent, biodegradable agent, silane coupling agent, or oxygen scavenger, within the range not inhibiting the effect of the invention.

(2) Production of Pellet

Individual EVOH resin pellet of the molding material of the invention has a circular or elliptical cross-section formed by plane cutting a pellet in transverse direction. The pellet has no edge and therefore an arbitrary cross-section of the pellet is approximate circle or ellipse. Such pellet is usually produced by melt extruding EVOH resin and cutting it before solidifying.

In the case that EVOH resin is melt-extruded and cut out with cutter into EVOH resin pieces while molten EVOH resin solidifies by cooling, an obtained EVOH resin piece droops at its cut end and forms into droplet due to its surface tension till the EVOH resin piece solidifies. As a result, a round pellet without edge is obtained. Thus produced pellet is sphere, approximate sphere, lenticular or oval, depending on the shape of EVOH resin melt-extruded. Common shapes of EVOH resin melt-extruded are rectangular and circular cylinder.

FIG. 1 is a photograph of pellets of a molding material of the invention. For the comparison, a photograph of circular cylindrical pellets obtained by a strand pelletizing process is shown in FIG. 2. Circular cylindrical pellets each has an edge appeared when the pellet inclines at a certain angle as shown in FIG. 2, whereas any surface plane of each pellet of the invention is approximate circle or oval without edges from viewing in any direction as shown in FIG. 1.

A production method of pellets will be described below.

EVOH resin as a raw material for pellets fed to a melt extrusion apparatus for manufacturing pellets may be (i) a solution or slurry of EVOH resin as it is after saponification in the production of EVOH resin, alternatively a water-containing EVOH resin composition with adjusted water content, or (ii) dry EVOH resin in a molten state, which is produced by melting EVOH resin pellets (dry EVOH resin pellets) obtained by strand pelletizing process.

(2-1) Case of Using Water-Containing EVOH Resin Composition as a Raw Material

In the case of using a water-containing EVOH resin composition as a raw material for pellets fed to an extruder, a preferable water-containing EVOH resin composition comprises 0 to 10 parts by weight of alcohol and 10 to 500 parts by weight of water, both based on 100 parts by weight of EVOH resin.

In the case of using a water-containing EVOH resin composition having a relatively high alcohol content, it is difficult to keep a safe environment of workplace or its surrounding area because of volatilization of alcohol in post-process. Water for cleansing pellets having a relatively high temperature for the purpose of removing alcohol are liable to cohere each other. On the other hand, pellets cleansing with water having a relatively low temperature makes cleansing time longer, resulting in lowering the efficiency of the production.

In the case of using a water-containing EVOH resin composition having a relatively high water content, molten EVOH resin piece immediately after being cut is liable to cohere each other, and produce ununiformly shaped pellets. Water-containing EVOH resin composition having a relatively low water content exhibits insufficient flowability, resulting in lowering productivity of pellets. A method of adjusting water content of water-containing EVOH resin composition for pellets is not limited. In order to increase water content, spraying water to resin, immersing resin in water, contacting resin with vaporized water or the like can be employed. In order to decrease the water content, drying is appropriately performed. Drying can be performed with a hot air fluidized bed dryer or hot air ventilation dryer. The hot air fluidized bed dryer is preferably used from the viewpoint of reducing dried spots. In addition, drying temperature is 120° C. or less from the viewpoint of reducing thermal deterioration.

EVOH resin solution after saponification usually contains a large amount of alcohol, however, the alcohol content can be reduced by contacting the EVOH resin solution with vaporized water. Water-containing EVOH resin composition having a reduced alcohol content can be led out of the container to serve a raw material for manufacturing pellets.

In the case of feeding water-containing EVOH resin composition to an extruder as a raw material for pellets, the temperature of water-containing EVOH resin composition in the extruder is chosen from the range of preferably 70 to 170° C., more preferably 80° C.; or more, further preferably 90° C. or more but 170° C. or less. If the temperature of water-containing EVOH resin composition is less than 70° C., EVOH resin would not be completely molten. If the temperature of water-containing EVOH resin composition exceeds 170° C., EVOH resin would be deteriorated due to heat. The temperature of resin composition is a temperature measured nearby discharging exit of extruder head with a temperature sensor set at the extruder cylinder.

The type of extruder is not limited, but the exit of the nozzle has a diameter of usually 1 to 10 mm, preferably 2 to 5 mm, from the viewpoint of handleability of pellets.

The number of blades of the cutter is usually from 2 to 8, preferably from 3 to 6.

The blades is preferably set in the manner that the blades contact with exit of dice of the extruder, that is to say, the dice-cutter distance may be 0 mm. However, the dice-cutter distance of 0.01 to 0.2 mm may be accepted.

The rotational frequency of the blades usually ranges from 500 to 2000 rpm, preferably 1000 to 1500 rpm.

The size and shape of individual pellet is controlled by exit diameter of the nozzle, number of blades of the cutter, rotational frequency of the blades and the like.

The water-containing EVOH resin composition extruded through dice, in which EVOH resin is in molten state, is cut before the EVOH resin solidifies by cooling. This is called hot-cut pelletizing process. The hot-cut pelletizing process is classified into air hot-cut pelletizing where molten resin is cut in the air, and underwater pelletizing where molten resin is extruded into water bath equipped with cutter and is cut underwater. Both pelletizing process may be employed. The underwater pelletizing can be carried out with underwater pelletizer.

The liquid for cooling is not limited to water. Water/alcohol mixed solution; aromatic hydrocarbons such as benzene; ketones such as acetone and methyl ethyl ketone; ethers such as dipropyl ether; organic esters such as methyl acetate, ethyl acetate, methyl propionate, and the like may be used. Of these, water or water/alcohol mixed solution may be used because of handleability. As for the water/alcohol mixed solution, water/alcohol ratio in weight is usually from 90/10 to 99/1. Alcohol such as methanol, ethanol, or propanol can be used for the alcohol, and methanol is preferably used in industries.

The temperature of the cooling liquid in the underwater pelletizing is such a temperature that molten EVOH resin extruded does not solidify quickly in the cooling bath, and is selected from the range of preferably −20 to 50° C., more preferably −5 to 30° C., in the case of the molten EVOH resin coming into contact with cooling liquid before being cut.

(2-2) Case of Using Dry EVOH Resin Pellet as a Raw Material

In the case of using dry EVOH resin pellets used as a raw material of a molding material of the invention, the dry EVOH resin pellets are fed to a kneading extruder and melt-extruded.

Dry EVOH resin pellets used as the raw material has no limitation in their size or shape.

EVOH resin temperature in kneading extruder should be set at a higher temperature than that of water-containing EVOH resin composition, for example, within the range of usually 150 to 300° C., preferably 200 to 285° C., particularly preferably 240 to 270° C. Less than 50° C. of the resin temperature would not completely melt EVOH resin pellets, but above 300° C. of the resin temperature would deteriorate EVOH resin due to such a high temperature. The EVOH resin temperature is measured nearby the discharging exit of extruder head with a temperature sensor placed on the extruder cylinder.

The extruder to be used is not particularly limited, but a typical extruder having a nozzle with bore diameter of 1.0 to 5.0 mmϕ, preferably 2.0 to 3.5 mmϕ, from the viewpoint of handleability.

Blade number of the cutter is usually from 2 to 8, preferably from 3 to 6.

Die-face cutter, whose blades face the discharge exit of the dice corresponding to the dice-cutter distance of 0 mm, is commonly used, however, the dice-cutter distance of 0.01 to 0.2 mm may be accepted.

A common rotational frequency of blades is in the range of 1000 to 2000 rpm, preferably 1250 to 1750 rpm.

Pellet shape can be controlled by adjusting bore diameter of the nozzle, number of blades, rotational frequency of blades, and the like.

Both of air hot-cut pelletizing process and underwater pelletizing process may be employed, as is the case in water-containing EVOH resin composition used for raw material. Cooling liquid listed in the case for water-containing EVOH resin composition may be also used in underwater pelletizing process. The temperature of the cooling liquid in underwater pelletizing process is commonly selected from the range of 0 to 90° C., preferably 20 to 70° C., which is higher than that in the case of using water-containing EVOH resin composition as raw material, because dry EVOH resin is liable to solidify comparing to water-containing EVOH resin composition.

Thus produced pellets are preferably subjected to cleansing with water. The pellets pelletized from water-containing EVOH resin composition generally contain alkaline metal salt of the catalyst left after the saponification in its production, which causes coloration or a like matter lowering quality of the final molded product. Therefore water cleansing of the pellets from water-containing EVOH resin composition is usually conducted in order to avoid quality loss of its final product.

Water cleansing is conducted in water bath set at a temperature of 10 to 60° C. For example, 100 parts by weight of EVOH resin pellets are cleansed with water of 200 to 1000 parts by weight, preferably 300 to 600 parts by weight, at a temperature of 20 to 50° C., preferably 25 to 35° C., for 0.5 to 5 hours, and this cleansing is executed from once to 5 times, preferably once. Such water cleansing can adjust properly the content of alcohol having 5 or less carbon atoms, acetic acid, and sodium acetate in EVOH resin, and can decontaminate oligomer or other impurities.

Such water cleansing can reduce the content up to 0.0001 to 1 part by weight of alcohol having 5 or less carbon atoms, 0.01 to 1 part by weight of acetic acid, and 0.01 to 1 part by weight of sodium acetate, based on 100 parts of EVOH resin pellets.

If necessary, EVOH resin pellets after water cleansing may allow to contact with aqueous solution of additives.

Examples of the additives include organic acids such as acetic acid, propionic acid, butyric acid, lauric acid, stearic acid, oleic acid, and behenic acid or alkaline metal (e.g. sodium and potassium) salt, alkaline earth metal (e.g. calcium and magnesium), or zinc salt thereof; or inorganic acids such as sulfuric acid, sulfurous acid, carbonic acid, phosphoric acid, and boric acid, or alkaline metal (e.g. sodium and potassium) salt, alkaline earth metal (e.g. calcium and magnesium) salt, or zinc salt thereof, or a like thermostabilizer.

Of these, acetic acid, boron compound such as boric acid or salt thereof, acetate or phosphate is particularly preferably used.

Contacting with the aqueous solution of additives can make the additives contained in EVOH resin pellets, thereby improving physical properties of EVOH resin such as thermal stability during melt-molding.

Contacting with the aqueous solution of additives can be conducted from 1 to 3 times (preferably once) at a temperature of 10 to 80° C. (preferably 20 to 60° C., particularly preferably 30 to 40° C.) for 0.5 to 5 hours, by using aqueous solution of additives in a concentration of 3% or less (preferably 0.3 to 1.5%) by weight. The amount of the solution to be used is 200 to 1000 parts by weight, preferably 300 to 600 parts by weight based on 100 parts of EVOH resin pellets.

By making contact with an aqueous solution of additives, the contents are preferably adjusted: acetic acid is from 0.001 to 1 part by weight, boric compound is from 0.001 to 1 part by weight as an amount of boron, and acetate or phosphate including hydrogenphosphate is from 0.0005 to 0.1 part by weight as an amount of metal, based on 100 parts of EVOH resin pellets. The amount of boron is determined with ICP atomic emission spectroscopy after incineration of the boric compound. The amount of metal is determined with ICP atomic emission spectroscopy after incineration of acetate and phosphate including hydrogenphosphate.

Water-containing EVOH resin pellets are dried after thus adjustment of the respective contents of ingredients contained therein. The water content of EVOH resin pellets after being dried is usually 1% by weight or less, particularly 0.5% by weight or less.

Any drying method may be employed for drying the pellets. For example, centrifugal dryer, a perforated conveyor belt that travels across an air knife, ventilation dryer, or fluidized bed dryer, may be used. Multistep drying method with any combination of these may be used.

If necessary, an additive may be added to thus EVOH resin pellets, for example, antioxidant, antistatic agent, colorant, ultraviolet absorber, lubricant, plasticizer, light stabilizer, surfactant, insecticide, drying agent, anti-blocking agent, fire retardant, crosslinking agent, curing agent, foaming agent, nucleating agent, anti-fogging agent, biodegradable agent, silane coupling agent, or oxygen scavenger, within the range not inhibiting the effect of the invention.

<Preparation of Pellet Mixture>

The molding material of the invention is characterized by comprising a combination of a first EVOH resin pellet (pellet 1) having ethylene unit content of 20 to 34 mol %, and a second EVOH resin pellet (pellet 2) having ethylene unit content of 35 to 60 mol %, and the difference of the ethylene unit content between the pellet 1 and pellet 2 is from 10 to 30) mol %.

The combination of two types of EVOH resin pellets differing in their ethylene unit content by the aforementioned range can solve the problem associated with feed property. The problem is not solved by one type of EVOH resin pellets alone. It is unclear for its mechanism, but it is supposed that pellet 2, which has higher ethylene unit content than pellet 1, starts to melt prior to melting pellet 1 and can act like lubricant for pellet 1, thereby reducing friction between the pellet 1 and screw.

EVOH resin pellets having ethylene unit content within the aforementioned range can be produced by controlling ethylene amount, i.e. ethylene pressure during the production of EVOH resin.

(1) First Type of EVOH Resin Pellets (Pellet 1)

A first type of EVOH resin pellets (pellet 1) has an ethylene unit content of 20 to 34 mol %, particularly 22 to 33 mol %, particularly preferably 24 to 32 mol %.

The pellet 1 may be produced by a pelletizing process as mentioned earlier with an EVOH resin having an aforementioned range of ethylene unit content.

Size and shape of the pellet 1 may be controlled by extruder type, dice shape, cutting conditions (in particular, a distance between dice and cutter, cutter rotational frequency), and so on.

Size of the pellet 1 is not particularly limited, but the pellet 1 has a maximum major axis (m) of its cross-section ranging from usually 1.0 to 10 mm, preferably 3.0 to 6.0 nm, more preferably 3.5 to 5.5 mm, particularly preferably 4.3 to 5.2 mm, and maximum minor axis ranging from usually 1.0 to 10 mm, preferably 2.5 to 6.0 mm, more preferably 3.0 to 5.5 mm, particularly preferably 3.5 to 5.2 mm. Unduly small pellets become powdery, resulting in becoming difficulty in handleability as a molding material. Unduly large pellets tend to impair feed property in melt extrusion molding.

The ratio (m/n) of major axis (m) to minor axis (n) is selected from the range of usually 1.0 to 2.0, preferably 1.0 to 1.8, particularly preferably 1.0 to 1.5. Unduly large ratio of major axis (min) to minor axis (n) means that the pellet shape is close to acicular, which tend to impair feed property in melt extrusion molding of the pellets.

The ratio (m/n)=1 means that the pellet is perfect sphere.

(2) Second Type of EVOH Resin Pellets (Pellet 2)

A second type of EVOH resin pellets (pellet 2) has an ethylene unit content of 35 to 60 mol %, preferably 36 to 55 mol %, particularly preferably 38 to 51 mol %, and the ethylene unit content of the pellet 2 is higher than that of EVOH resin pellet 1 by 10 to 30 mol %. If the difference of ethylene unit content between the pellet 1 and pellet 2 is unduly small, the pellet 2, which has higher ethylene unit content than the pellet 1, has difficulty in preferentially melting. Such a combination having too small difference in ethylene unit content cannot make a sufficient effect regardless of the combination of pellets differing in their ethylene unit content.

The pellet 2 may be produced by a pelletizing process as mentioned earlier with an EVOH resin having an aforementioned range of ethylene unit content as a raw material.

Size and shape of the pellet 2 may be controlled by extrusion type, shape of dice, cutting conditions such as particularly a distance between dice and cutter, and cutter rotation frequency.

The size of the pellet 2 is not particularly limited, but has a cross-section of maximum major axis (m') ranging from usually 1.0 to 10 mm, preferably 3.0 to 6.0 mm, more preferably 3.5 to 5.5 mm, particularly preferably 4.3 to 5.2 mm, and maximum minor axis (n') ranging from usually 1.0 to 10 mm, preferably 2.5 to 6.0 mm, more preferably 3.0 to 5.5 mm, particularly preferably 3.5 to 5.2 mm. Unduly small pellet 2 tends to make pellets become powdery, resulting in impairing handleability. Unduly large pellet tends to impair feed property in melt extrusion molding.

The ratio (m'/n') of major axis (m') to minor axis (n') of the EVOH resin pellet 2 is selected from the range of usually 1.0 to 2.0, preferably 1.0 to 1.8, particularly preferably 1.0 to 1.5. If the ratio of major axis to minor axis is unduly large, the pellet shape is close to acicular, resulting in impairing feed property in melt extrusion molding.

As long as both sizes of the EVOH resin pellet 1 and EVOH resin pellet 2 fall in the aforementioned ranges respectively, both pellets have the same or different mean size or shape from each other. Preferably, both of pellet 1 and pellet 2 are nearly perfect sphere. In the case that the pellets 1 and 2 are lenticular shape having elliptical cross-section, it is preferable that the pellet 2 which melts prior to the pellet 1 has a larger mean size.

(3) Mixture of Pellet 1 and Pellet 2

A molding material of the invention comprises a mixture of said EVOH resin pellet 1 and said EVOH resin pellet 2.

A mixing ratio in weight of the EVOH resin pellet 1 and EVOH resin pellet 2, i.e. pellet 1/pellet 2, is selected from the range of usually 95/5 to 50/50, preferably 90/10 to 55/45, particularly preferably 85/15 to 60/40. The EVOH resin pellet 1 having lower ethylene unit content exhibits excellent gas barrier property but has a problem associated with feed property. The problem may be solved by mixing with the pellet 2 having an aforementioned range of ethylene unit content.

According to the invention, the EVOH resin pellets are a mixture of the pellet 1 and pellet 2 wherein the former is a first EVOH resin pellet having ethylene unit content of 20 to 34 mol % and the latter is a second EVOH resin pellet having an ethylene unit content of 35 to 60 mol % and each of them has almost circular or elliptical cross-section. The difference of ethylene unit content between the pellet 1 and pellet 2 ranges from 10 to 30 mol %. Such a mixture can be improved in feed property with screw when the pellets are used as a molding material for melt extrusion molding.

The EVOH resin pellet 1 and the EVOH resin pellet 2 may be mixed by mechanical mixing, for example, dry-blend with banbury mixer or a like apparatus.

The molding material of the invention may contain, besides the mixture of the EVOH resin pellet 1 and the EVOH resin pellet 2, another type of EVOH resin pellets (i.e. a third EVOH resin pellet) having an ethylene unit content different from that of the pellets 1 and 2, in an amount not inhibiting the effect of the invention. A preferable third EVOH resin pellet has no edge by cutting melt-phase EVOH resin. The rate of the third EVOH resin pellet in EVOH resin pellets constituting molding material of the invention is in the range of 40% by weight or less, more preferably 30% by weight or less, further more preferably 20% by weight or less.

Accordingly, the content of the pellet 1 is preferably in the range of 55 to 90% by weight, more preferably 60 to 85% by weight, based on the total weight of EVOH resin pellets.

<Use of Molding Material>

A molding material of the invention as constructed mentioned above, exhibits excellent feed property, and therefore is applicable to a molding material for a molded article of EVOH resin. On the other hand, in the case that EVOH resin pellets by hot-cut pelletizing process are used alone, feed property cannot be satisfied although the EVOH resin pellets have no edge. Even if a pellet mixture of strand cut pellets differs in their ethylene unit content, the pellet mixture cannot satisfy feed property. Moreover, in the case that a mixture of EVOH resin pellets differs in their ethylene content but the difference is too small, an improved feed property is not obtained regardless that individual pellet of the mixture has no edge. Satisfactory feed property can be accomplished in the only case that a mixture of a first EVOH resin pellet (pellet 1) and a second EVOH resin pellet (pellet 2) meets the following conditions: i) the pellet 1 has an ethylene unit content of 20 to 34 mol % and the pellet 2 has an ethylene unit of 35 to 60 mol %; ii) the difference of ethylene unit content between the pellet 1 and pellet 2 is in the range of 10 to 30 mol %; and iii) both of the pellets 1 and 2 have no edge. The reason is not clear, but it is supposed that pellets each having no edge could reduce wear of screw while pellets are molten and plasticated, the pellet 2 having higher ethylene unit content melts faster than the pellet 1 and acts as a lubricant for the pellet 1, thereby attaining excellent flowability in early stage of melt and plasticating zone.

The molding material of the invention may be used as a material for melt-molding, especially an extrusion molding material for film, sheet, and fiber. As to the melt-molding process, extrusion molding process such as T-die extrusion, tubular film extrusion, blow molding, melt spinning and contour extrusion, and injection molding process are primarily employed.

The type of extruder is not limited as long as the different types of pellets melt and mix homogeneously during melt-kneading and extruding. Either screw or plunger type may be used for melt or plasticating zone, but screw type is preferably used. Either vertical extruder or horizontal extruder may be used, and either single or twin type screw may be used. The ratio L/D of length to diameter of the screw, i.e. screw length/screw diameter, as well as compression ratio (C) are not limited, but a common L/D ranges from 20 to 35, preferably 25 to 30, a common C ranges from 1.5 to 8, preferably 2 to 5.

Melt-molding temperature is usually selected from the range of 150 to 300° C.

Film or sheet as it is may be molded for a variety of use. In general, the film or sheet is laminated with a certain substrate for increasing strength or imparting another function. EVOH resin film or sheet, or a laminate thereof produced from the molding material of the invention is utilized for packaging substance for food, industrial medicine, agricultural chemicals, and so on, because of the excellent gas-barrier property. The EVOH resin film, sheet or laminate may be post-molded into cup or bottle.

As the said substance used for the lamination, a thermoplastic resin is used. Examples of the substrate include polyolefins such as polyethylenes including linear low density polyethylene, low density polyethylene, very low density polyethylene, medium density polyethylene, and high density polyethylene, polypropylene, ethylene-propylene block- or random-copolymer, copolymer of propylene and α-olefin having from 4 to 20 carbon atoms, polybutene, and polypentene; graft modified polyolefins in which the aforementioned polyolefin is graft modified with unsaturated carboxylic acid or its ester, ionomer, ethylene-vinyl acetate copolymer, ethylene-acrylic acid copolymer, ethylene-acrylate copolymer, polyester-based resin, polyamide-based resin including copolyamide, polyvinyl chloride, polyvinylidene chloride, acryl-based resin, polystyrene, vinyl ester-based resin, polyester elastomer, polyurethane elastomer, halogenated polyolefin such as chlorinated polyethylene and chlorinated polypropylene, aromatic or aliphatic polyketone, and polyalcohols obtained by reducing these polymers. From the viewpoint of practical utility including physical property such as strength of the resulting multilayered structure, polyolefin-based resin and polyamide-based resin are preferably used, and polyethylene and polypropylene are particularly used.

These substrate resin may contain a conventionally known additive such as antioxidant, antistatic agent, lubricant, nucleating agent, anti-blocking agent, ultraviolet absorber, and wax within the range not inhibiting the effect of the invention.

A multilayered sheet or film comprising a layer of the molding material of mixed EVOH resin pellets (i.e. EVOH resin mixture) of the invention and substrate resin layer may be produced by a known lamination process. Examples of the lamination processes include extruding a substrate resin melt on the film or sheet made from the molding material; extruding molten EVOH resin mixture on film or sheet of substrate resin; coextruding EVOH resin mixture and substrate resin; a process of assembling EVOH resin mixture (layer) and substrate resin (layer) using a known adhesive such as organic titanium compound, isocyanate compound, polyester-based compound, or polyurethane compound; coating a solution of EVOH resin mixture on a film or sheet of substrate resin, and then removing the solvent of the solution.

Of these processes, coextrusion is preferably employed from the viewpoint of cost and environment. The molding material of the invention may be applied to coextrude with another thermoplastic resin. Since the molding material has excellent film moldability and reduces the variation in film width during melt-extruding, the molding material is suitable for a material for multilayered structure produced by melt coextrusion with other thermoplastic resin.

Arbitrary structure of the multilayered sheet or film may be employed. Not only double layered structure of a/b but also various structures such as b/a/b, a/b/a, a1/a2/b, a/b1/b2, b2/b1/a/b1/b2, b2/b1/a/b1/a/b1/b2 and other structure may be employed, wherein the layer of EVOH resin mixture is denoted by "a" (for example, a1, a2, . . . ) and the layer of substrate resin is denoted by "b" (for example, b1, b2, . . . ). A recycled material, which is obtained by re-melt molding waste edges and scraps generated in the production of a multilayered structure, comprises EVOH resin mixture and a substrate resin, and therefore may be utilized to form a multilayered sheet or film such as b/R/a, b/R/a/b, b/R/a/R/b, b/a/R/a/b, and b/R/a/R/a/R/b, wherein "R" denotes a layer of the recycled material.

Such multilayered sheet or film may be subjected to a hot drawing treatment for additional improvement of physical properties. A known hot drawing treatment may be applied.

In the drawing treatment, not only roll drawing, tenter drawing, tubular drawing, or blow drawing, but also deep forming, vacuum forming or a forming at high drawing ratio may be applied. Either simultaneous biaxial orientation or consecutive biaxial orientation may be employed for biaxial drawing process. The drawing temperature is selected from the range of 80 to 170° C., preferably 100 to 160° C.

After drawing treatment, heat setting is preferably executed with use of well known means. Thus obtained stretched film or sheet is subjected to heat treatment at 80 to 170° C., preferably 100 to 160° C. for 2 to 600 seconds during keeping stretched.

In the case that a multilayered film or sheet is used for heat shrinking package for raw meat, processed meat, cheese and so on, a multilayered film or sheet after stretched but not heat set is used as a final film or sheet in the manner to wrap the raw meat, processed meat, cheese and so on. The wrapped substance is heated at a temperature from 50 to 130° C., preferably 70 to 120° C. for 2 to 300 seconds, thereby shrinking to complete tight packaging.

Multilayered structure may be in any shape such as film, sheet, tape, bottle, pipe, filament, or contour extruded product. Such a multilayered structure may be subjected to heat treatment, cooling treatment, drawing, printing, dry laminating, solution or molten liquid coating, bag making, deep drawing, box making, tube making, or splitting, according to necessity.

EXAMPLE

Hereinafter the present invention is described below based on examples, but the invention is not restricted by the examples unless exceeding the gist of the invention.

Incidentally, the unit "part" in the examples is on the basis of weight unless otherwise indicated.

<EVOH Resin Production of Pellet>
(1) EVOH Resin Pellet (UP1)

Columnar shaped pellets produced by strand pelletizing process using EVOH resin having water content of 0.1%, were supplied to twin screw extruder. The EVOH resin has ethylene unit content of 29 mol %, saponification degree of 99.6 mol %, and MFR of 4.0 g/10 minutes (210° C., load of 2160 g). The EVOH resin pellets were melt-kneaded and EVOH resin melt was pelletized by underwater pelletizing process with the following conditions, wherein the EVOH resin melt was extruded into a cooling trough and cut into pieces by passing through the cutter having 16 blades mounted on outlet of the extruder. The cut EVOH resin pieces each was dried to provide oval EVOH resin pellets each having cross-sections shown in FIG. 3 and FIG. 4. FIG. 4 shows a cross-section made by a plane cutting along a major axis of the oval pellet, which is ellipse having a maximum major axis of 4.6 mm and maximum minor axis of 3.5 mm.

screw inner diameter: 70 mm
L/D: 39
screw rotational frequency: 300 rpm
dice temperature: 260° C.
cylinder temperature (highest temperature): 260° C.
nozzle bore diameter: 3.2 mmφ
discharge amount: 350 kg/h rotational frequency of cutter blade: 1500 rpm
cooling water temperature: 60° C.

(2) EVOH Resin Pellet (UP2)

Columnar shaped pellets produced by strand pelletizing process using EVOH resin having water content of 0.2%, were supplied to twin screw extruder. The EVOH resin has ethylene unit content of 44 mol %, saponification degree of 99.7 mol %, and MFR of 3.6 g/10 (minutes (210° C., load of 2160 g). The EVOH pellets were melt-kneaded and pelletized by underwater pelletizing process with the conditions below, wherein the EVOH resin melt was extruded into cooling trough and cut into EVOH resin pieces by passing through the cutter having 3 blades mounted on outlet of the extruder. The cut EVOH resin was dried to provide approximately spherical EVOH resin pellets each of which has cross-sections shown in FIG. 5 and FIG. 6. These cross-sections were obtained by cutting the pellet in transverse section with each other. Approximate circles shown in FIGS. 5 and 6 had a maximum major axis of 4.9 mm and maximum minor axis of 4.8 mm.
  screw inner diameter: 70 mm
  L/D: 37
  screw rotational frequency: 100 rpm
  dice temperature: 250° C.
  cylinder temperature (highest temperature): 220° C.
  nozzle bore diameter: 2.4 mmφ
  discharge amount: 100 kg/h
  rotational frequency of cutter blade: 1500 rpm
  cooling water temperature: 50° C.

(3) Production of EVOH Resin Pellet (UP3)

EVOH resin solution, which was a solution having an EVOH resin content of 45% and used a mixture having water/methanol ratio in weight 60/40 as a solvent, was used as a raw material for pellets. The EVOH resin solution was pelletized by underwater pelletizing process in a manner that the EVOH resin solution flowed through the exit equipped with a cutter having 3 blades into a cooling water trough. The EVOH resin was cut into pieces and dried, thereby obtaining approximately oval EVOH resin pellets. The EVOH pellet has a cross-section of ellipse with maximum major axis of 3.9 mm and maximum minor axis of 2.9 mm.
  nozzle bore diameter: 3.3 mmφ
  discharge amount: 15 kg/h
  rotational frequency of cutter blade: 700 rpm
  cooling water temperature: 3° C.

(4) Production of EVOH Resin Pellet (UP4)

As a raw material for EVOH resin pellet (UP4), used the EVOH resin pellets each of which had columnar shape, a water content of 0.2% and was produced by strand pelletizing process using EVOH resin having ethylene unit content of 38 mol %, saponification degree of 99.7 mol % and MFR of 3.8 g/10 minutes (210° C., load of 2160 g). Approximately spherical EVOH resin pellets (UP4) were produced in the same manner as EVOH resin pellets (UP2) except utilizing EVOH resin pellets as the raw material thereof. The EVOH resin pellet (UP4) had approximate circular cross-sections in a longitudinal direction and a horizontal direction as was the case with EVOH resin pellet UP2, the circle having maximum major axis of 4.9 mm and maximum minor axis of 4.8 mm.

(5) Production of EVOH Resin Pellet (SP1)

EVOH resin pellets (SP1) were produced by strand pelletizing process using a water-containing EVOH resin composition comprising water/methanol mixture having a weight ratio of 40/60, and EVOH resin having ethylene unit content of 29 mol %, saponification degree of 99.6 mol %, and MFR of 3.4 g/10 minutes (210° C., load of 2160 g). The content of EVOH resin in the composition is 45%. The water-containing EVOH resin composition was extruded in the form of rod through a cylindrical nozzle having inner diameter of 0.4 cm and length of 6.0 cm into a coagulation bath filled with water/methanol mixture having a weight ratio of 95/5 and kept at 5° C. EVOH resin composition in the form of rod was cut into pellets by strand pelletizing process, and dried. The obtained EVOH resin pellet had a columnar shape having 2.5 mm in diameter of bottom surface and 2.6 mm in height, and had water content of 0.2%. Therefore, the EVOH resin pellet had almost circular cross-section as shown in FIG. 7 and rectangular cross-section as shown in FIG. 8, wherein FIG. 7 and FIG. 8 were photographs of the cross-sections of the EVOH resin pellet cut at parallel plane to its bottom and cut along the height direction respectively.

(6) Production of EVOH Resin Pellet (SP2)

EVOH resin pellet (SP2) was produced by strand pelletizing process using EVOH resin having ethylene unit content of 44 mol %, saponification degree of 99.7 mol %, and MFR of 3.6 g/10 minutes (210° C., load of 2160 g) as follows. The EVOH solution, in which the solvent was water/methanol mixture having a weight ratio of 20/80, and EVOH resin content was 45%, was extruded in the form of rod through a cylindrical nozzle having inner diameter of 0.4 cm and length of 6.0 cm into a coagulation bath filled with water/methanol mixture having a weight ratio of 95/5 and kept at 5° C. The solidified rod, i.e. strand, was cut into pellets in the coagulation bath for cooling, and dried. Thus obtained pellets had columnar shape having 2.5 mm in diameter of its bottom surface and 2.6 mm in its height and had a water content of 0.2%.

<Preparation of Molding Material Nos. 1 to 8 and Evaluation of their Feed Property>

Thus produced spherical EVOH resin pellets were dry blended at a weight ratio defined in Table 1 to prepare a molding material. Only one type of EVOH resin pellets as indicated in Table 1 was employed for respective molding material Nos. 3 to 6.

Thus prepared molding material were formed into EVOH resin film having a thickness of 50 μm under the conditions below. In the film production, noise was heard at the position of 50 cm apart from the extruder and noise level was classified into the following three groups for evaluation of feed property.
(Conditions of Film Forming)
screw inner diameter: 19 mm
L/D: 25
screw compression ratio: 2
T die: coat hanger type
die size: 150 mm
extrusion temperature (° C.): C1/C2/C3/C4/C5 (adapter)/C6 (die)=190/210/210/210/210/210
(Feed Property)
  ○: almost no noise;
  Δ: noise emitted but its level is not problematic; and
  x: loud noise emission.

TABLE 1

| | | | Molding material No. | | | | | | | |
|---|---|---|---|---|---|---|---|---|---|---|
| | | | 1 | 2 | 3 | 4 | 5 | 6 | 7 | 8 |
| EVOH Resin pellet | UP1 | 29 mol % underwater | 75 parts | — | 100 parts | — | — | — | 75 parts | 75 parts |
| | UP2 | 44 mol % underwater | 25 parts | — | — | — | 100 parts | — | — | — |
| | UP3 | 32 mol % Underwater | — | — | — | — | — | — | 25 parts | — |
| | UP4 | 38 mol % Underwater | — | — | — | — | — | — | — | 25 parts |
| | SP1 | 29 mol % Strand | — | 75 parts | — | 100 parts | — | — | — | — |
| | SP2 | 44 mol % Strand | — | 25 parts | — | — | — | 100 parts | — | — |
| | Δ Et (mol %) | | 15 | 15 | 0 | 0 | 0 | 0 | 3 | 9 |
| | Feed property | | ○ | X | Δ | X | X | X | Δ | X |

Ethylene unit content and type of pelletizing process are indicated in upper line and lower line of each pellet row respectively.

It is understood from Table 1 that EVOH resin pellets produced by strand pelletizing process could not exhibit satisfactory feed property without depending on ethylene unit content of the EVOH resin (molding material Nos. 4 and 6). Both molding material Nos. 3 and 5, which were pellets produced by underwater pelletizing process, could not exhibit satisfactory feed property without depending on ethylene unit content.

In the case of using a mixture of two types of EVOH resin pellets differing in their ethylene unit content, the mixture of EVOH resin pellets produced by strand pelletizing process could not exhibit satisfactory feed property (molding material No. 2), whereas the mixture of EVOH resin pellets produced by underwater pelletizing process could provide satisfactory feed property (molding material No. 1). However, if the mixture was a combination that the difference in their ethylene unit content is less than 10 mol %, insufficiently improved feed property were not provided (molding material No. 7 and 8).

INDUSTRIAL APPLICABILITY

The molding material exhibits excellent feed property in melt-molding. This makes effective for improving working environment in production site and reducing load to extruder. Accordingly, the molding material is preferably utilized in production site.

The invention claimed is:

1. A molding material comprising saponified ethylene-vinyl ester-based copolymer pellets,
   each of said saponified ethylene-vinyl ester-based copolymer pellets has approximately circular or elliptical cross-section having a ratio of major axis to minor axis ranging from 1.0 to 1.5;
   said saponified ethylene-vinyl ester-based copolymer pellets being a pellet mixture comprising a first saponified ethylene-vinyl ester-based copolymer pellet (pellet 1) having an ethylene unit content of 20 to 34 mol %, and a second saponified ethylene-vinyl ester-based copolymer pellet (pellet 2) having an ethylene unit content of 35 to 60 mol %;
   the difference in ethylene unit between the first and second saponified ethylene-vinyl ester-based copolymer pellets being from 10 to 30 mol %;
   the first and second saponified ethylene-vinyl ester-based copolymer pellets each having a saponification degree of more than 99 mol % to 100 mol %; and
   a ratio (pellet 1/pellet 2) in weight of content of the first saponified ethylene-vinyl ester-based copolymer pellet (pellet 1) to the second saponified ethylene-vinyl ester-based copolymer pellet (pellet 2) being in the range of 95/5 to 50/50.

2. The molding material according to claim 1, wherein the saponified ethylene-vinyl ester-based copolymer pellets are obtained by cutting molten saponified ethylene-vinyl ester-based copolymer into pellets.

3. The molding material according to claim 2, wherein said cutting is performed by extruding molten saponified ethylene-vinyl ester-based copolymer into water and cutting the still molten saponified ethylene-vinyl ester-based copolymer in water.

4. The molding material according to claim 1, wherein the pellet mixture is a dry blend of the first saponified ethylene-vinyl ester-based copolymer pellet and the second saponified ethylene-vinyl ester-based copolymer pellet.

5. The molding material according to claim 1, wherein the first saponified ethylene-vinyl ester-based copolymer pellet has a cross-section of ellipse or circle having major axis of 1 to 10 mm and minor axis of 1 to 10 mm, and the second saponified ethylene-vinyl ester-based copolymer pellet has a cross-section of ellipse or circle having major axis of 1 to 10 mm and minor axis of 1 to 10 mm.

6. A method of preparing a saponified ethylene-vinyl ester-based copolymer pellet composition for melt extrusion molding thereof, comprising
   feeding a pellet mixture of a first saponified ethylene-vinyl ester copolymer pellet (pellet 1) and a second saponified ethylene-vinyl ester copolymer pellet (pellet 2) into a screw extruder,
   wherein the pellet 1 has an ethylene unit content of 20 to 34 mol % and is approximate circle or ellipse in cross-section having a ratio (m/n) of major axis (m) to minor axis (n) ranging from 1.0 to 1.5, and the pellet 2 has an ethylene unit content of 35 to 60 mol % and is approximate circle or ellipse in cross-section having a ratio (m'/n') of major axis (m') to minor axis (n') ranging from 1.0 to 1.5, and they differ in their ethylene unit content by 10 to 30 mol %, and the first and second saponified ethylene-vinyl ester-based copolymer pellets having a saponification degree of more than 99 mol % to 100 mol %, and a ratio (pellet 1/pellet 2) in weight of content of the first saponified ethylene-vinyl ester-based copolymer pellet (pellet 1) to the second saponified ethylene-vinyl ester-based copolymer pellet (pellet 2) is in the range of 95/5 to 50/50; and melting the pellet composition, and extruding the melted composition from the extruder.

* * * * *